United States Patent [19]

Moon

[11] 4,364,972

[45] Dec. 21, 1982

[54] PRESSURE-SENSITIVE ADHESIVE COPOLYMERS OF ACRYLIC ACID ESTER AND N-VINYL PYRROLIDONE

[75] Inventor: John D. Moon, Hastings, Minn.

[73] Assignee: Minnesota Mining and Manufacturing Company, St. Paul, Minn.

[21] Appl. No.: 225,763

[22] Filed: Jan. 16, 1981

[51] Int. Cl.$^3$ ............................ B05D 3/06; C08F 8/00
[52] U.S. Cl. ................................ 427/54.1; 204/14 R; 204/15; 204/23; 428/345; 428/355
[58] Field of Search ................. 427/54.1, 42; 526/264; 428/355, 345; 204/159.23, 159.15, 159.14

[56] References Cited

U.S. PATENT DOCUMENTS

| | | | |
|---|---|---|---|
| Re. 24,906 | 12/1960 | Ulrich | 206/59 |
| 3,725,122 | 3/1973 | Reinhard | 526/264 |
| 3,728,148 | 4/1973 | Pietsch et al. | 117/93.31 |
| 4,181,752 | 1/1980 | Martens et al. | 427/54.1 |
| 4,195,103 | 3/1980 | Chang | 204/159.23 |

FOREIGN PATENT DOCUMENTS 55-2239  1/1980  Japan.

*Primary Examiner*—Theodore Morris
*Attorney, Agent, or Firm*—Cruzan Alexander; Donald M. Sell; Robert E. Granrud

[57] ABSTRACT

Pressure-sensitive adhesive tape which has both high adhesion and high cohesion values and adheres strongly to automotive paints and to rubber or plastic foam layers, thus showing great promise for adhering plastic molding strips to the sides of automobiles. The adhesive layer of the novel tape may be made by photopolymerizing (1) acrylic acid ester of non-tertiary alcohol, the alkyl groups of which have an average of 4–14 carbon atoms and (2) N-vinyl-2-pyrrolidone in an amount within 15–50 parts by weight of the total monomers (1) and (2), preferably 25–35 parts.

6 Claims, No Drawings

PRESSURE-SENSITIVE ADHESIVE COPOLYMERS OF ACRYLIC ACID ESTER AND N-VINYL PYRROLIDONE

BACKGROUND TO THE INVENTION

U.S. Pat. No. Re. 24,906 (Ulrich) concerns pressure-sensitive adhesive copolymer of about 88–97 parts of acrylic acid ester of non-tertiary alcohol, the alkyl groups of which have an average of 4–12 carbon atoms in the alkyl group, and correspondingly about 12–3 parts by weight of at least one modifying copolymerizable monomer such as acrylic acid, itaconic acid or acrylamide. A tape coated with the copolymer exhibits excellent adhesion and holding power, and the adhesive coating experiences no observable deterioration even after the tape has been stored for a number of years. Such tapes are widely used for a variety of purposes.

U.S. Pat. No. 3,728,148 (Pietsch et al.) teaches pressure-sensitive adhesive copolymer similar to that of Re. 24,906 except that the modifying copolymerizable monomer is an unsubstituted N-vinyl lactam, preferably N-vinyl-2-pyrrolidone, and is used in amounts from 10 to 30% by weight of total monomer, preferably 10 to 20% by weight. By this change in copolymerizable monomer, it is said that good electrical insulating properties are obtained compared to the corrosive effects on conductors of the copolymerizable monomers used in No. Re. 24,906. All self-adhesive properties, viz., adhesion, cohesion and gripping capacity, are said to be improved. The Pietsch patent teaches that the Fikentscher K-value of the copolymer, a measure of average molecular weight, should be from 50 to 100, preferably 60 to 90.

While the Pietsch and Ulrich patents disclose only polymerization in solution or in emulsion, U.S. Pat. No. 4,181,752 (Martens et al.) discloses and claims a process for preparing the same class of pressure-sensitive adhesive copolymers by subjecting a solvent-free coating of the liquid monomers to radiation having wavelengths of 3000–4000 A at a rate of 0.1 to 7 milliwatts per square centimeter of the exposed coating, while controlling the amount of radiation of shorter wavelengths to not more than about 10% of the amount of energy in the 3000–4000 A range. As compared to processes disclosed in the Ulrich patent, this process both reduces total energy requirements and eliminates pollution problems. N-vinylpyrrolidone is one of the modifying copolymerizable monomers used in the Martens patent.

In spite of the aforementioned teaching in the Pietsch and Martens patents, it is believed that no one has ever marketed a pressure-sensitive adhesive or adhesive copolymer of acrylic acid ester and an N-vinyl lactam such as N-vinylpyrrolidone. We surmise that there has been little or no commercialization due to inferior adhesive properties. Even though the Pietsch patent speaks of improved adhesive properties, the values given in the examples for "adhesive power" and "holding power" are considerably lower than those of pressure-sensitive adhesive tapes now on the market.

To improve the "holding power" of a pressure-sensitive adhesive, one must usually increase its cohesive strength. This usually is accomplished at the expense of tackiness and the ability to bond quickly, often called quick-stick.

SUMMARY OF THE INVENTION

The present invention concerns a pressure-sensitive adhesive copolymer which, like that of the Pietsch Pat. No. 3,728,148, is a copolymer of
 (1) a major proportion of acrylic acid ester of non-tertiary alcohol, the alkyl groups of which have an average of about 4 to 12 or 14 carbon atoms, said acrylic acid ester being per se polymerizable to a sticky, stretchable, elastic adhesive mass and
 (2) a minor proportion of N-vinyl-2-pyrrolidone and is substantially free from materials which would have a corrosive effect.

When a pressure-sensitive adhesive copolymer of the present invention is uncrosslinked, it differs from uncrosslinked copolymers of the Pietsch patent in that its average molecular weight is higher, as indicated by a Fikentscher K-value exceeding 100. When crosslinked, the copolymer of the present invention has greater average molecular weight between crosslinks as compared to a crosslinked copolymer of Pietsch as indicated by a gel swell in ethyl acetate exceeding 600%, whereas the gel swell of a crosslinked Pietsch copolymer is below 500%, and usually below 400%. The copolymer of the present invention also differs from that of Pietsch in that the proportion of the N-vinyl-2-pyrrolidone exceeds 15 parts and does not exceed 50 parts by weight of the total monomers (1) and (2), whereas in Pietsch the N-vinyl-2-pyrrolidone comprises 10–30 parts by weight of the total monomer. Whether crosslinked or uncrosslinked, the novel copolymer unexpectedly provides appreciably higher adhesion and cohesion values than does that of Pietsch without any observable disadvantage. The improvement is especially great when comparing uncrosslinked adhesive tapes. The adhesion and cohesion values of uncrosslinked adhesive tapes of the present invention are high enough that the slightly higher costs of crosslinking should not be necessary unless the tapes must be able to withstand unusually high temperatures in use.

As compared to the pressure-sensitive adhesive copolymers of the examples of the Martens patent, the novel copolymer also provides better adhesion and cohesion values. Because the novel copolymer adheres strongly to automotive paints and to rubber or plastic foam layers, it shows great promise in foam-backed, pressure-sensitive adhesive tapes for automotive use, such as for adhering plastic molding strips to the sides of automobiles for both decorative and protective purposes. Useful double-coated, foam-backed, pressure-sensitive adhesive tapes of the present invention have been made using as the foam-backing a polychloroprene foam having a thickness of 1 to 1.2 mm and a density of 550 to 750 kg/m$^3$. For such uses, best results have been realized at a weight ratio of the acrylic acid ester to the N-vinyl-2-pyrrolidone within the range of 75:25 to 65:35. At ratios above 80:20, cohesion values are significantly reduced and adhesion values are not improved. At ratios below 60:40, tackiness is significantly reduced and cohesion values such as holding power are erratic.

The novel pressure-sensitive adhesive copolymers can be made as in the process disclosed in the Martens patent which includes the steps of
 (a) preparing a radiation-sensitized, solventless, mixture comprising by weight
  (1) a major proportion of acrylic acid ester non-tertiary alcohol, the alkyl groups of which have an average of about 4 to 12 or 14 carbon atoms, said acrylic acid ester being per se polymerizable to a sticky, stretchable, elastic adhesive mass, (2) A minor proportion of at least one modifying monomer copolymerizable therewith, and (3) 0.01 to 5 parts of a photoinitiator per 100 parts of the total monomers (a) and (b) and (b) exposing the mixture in an inert atmosphere to ultraviolet radiation until at least 95% of the monomer has been polymerized.

The process of the present invention differs from that of the Martens patent in that the modifying copolymerizable monomer (2) is N-vinyl-2-pyrrolidone, is present in an amount exceeding 15 parts per 100 parts by weight of the total monomers (1) and (2), and is substantially free from other modifying copolymerizable monomers named at col. 3, lines 60-64 of the Martens patent. Any appreciable proportion of those other modifying copolymerizable monomers such as acrylic acid or acrylamide would, in combination with the N-vinyl-2-pyrrolidone, tend to result in an undesirable decrease in adhesive properties, especially quick-stick. For example, a polymer of, by weight, 69 parts of isooctyl acrylate, 29 parts of N-vinyl-2-pyrrolidone and 2 parts of acrylic acid would be virtually tack-free. Since substantially no free acid is present in the copolymerizable monomers, the resulting copolymer is noncorrosive and has good electrical insulating properties. The novel process is further characterized in that the polymerization in step (b) is so controlled as to produce an uncrosslinked copolymer of high average molecular weight, e.g., having a Fikentscher K-value exceeding 100, or a crosslinked copolymer having a gel swell in ethyl acetate exceeding 600%.

While the Martens patent suggests the utility of N-vinyl-2-pyrrolidone as a modifying monomer (2), it illustrates its use only in combination with acrylic acid and acrylamide, shows a preference for keeping the total modifying monomer (2) below 15 parts, and does not suggest that it might be advantageous to attain a copolymer which when uncrosslinked has high average molecular weight. The copolymers of its examples have inherent viscosities of from 0.72 to 2.77. Inherent viscosities correspond approximately to Fikentscher K-values as follows:

| Inherent viscosity | K-value |
|---|---|
| 0.72 | 67 |
| 1.55 | 100 |
| 2.0 | 110 |
| 2.65 | 125 |
| 2.77 | 135 |

As is taught in the Martens patent, the evolution of solvents is avoided by photopolymerizing a coating on a backing member which may have a release surface in order to permit the resultant adhesive layer to be transferred, such as to a foam backing. However, the viscosity of the aforementioned solventless, liquid mixture of the polymerizable monomers (1) and (2) and photoinitiator (3) would be too low to provide uniform coatings of thicknesses most useful for pressure-sensitive adhesive tapes, e.g., 25 to 250 micrometers. Accordingly, a container of the mixture may first be exposed to ultraviolet radiation to provide a partially-polymerized uncrosslinked syrup having a viscosity of 300 to 20,000 centipoises at ordinary room temperature. The partial polymerization may be carried out in air by using at least 0.01 part of an oxidizable tin salt such as stannous octoate as taught in U.S. Pat. No. 4,303,485 and may be stopped at any point by turning off the ultraviolet radiation. After the syrup has been coated onto a backing member, the coating may be exposed to ultraviolet radiation to complete the polymerization to either an uncrosslinked or a crosslinked state, depending upon whether or not a crosslinking agent has been added before the second exposure. Alternatively, the syrup may be prepared by conventional thermal polymerization techniques.

Photoinitiators which are useful for partially or completely polymerizing alkyl acrylate monomer without crosslinking include the benzoin ethers (such as benzoin methyl ether or benzoin isopropyl ether), substituted benzoin ethers (such as anisoin methyl ether), substituted acetophenones (such as 2,2-diethoxyacetophenone and 2,2-dimethoxy-2-phenylacetophenone), substituted alpha-ketols (such as 2-methyl-2-hydroxypropiophenone), aromatic sulfonyl chlorides (such as 2-naphthalenesulfonyl chloride) and photoactive oximes [such as 1-phenyl-1,1-propanedione-2-(O-ethoxycarbonyl)oxime]. They are preferably used in amount which as dissolved provide about 0.05 to 1 part per 100 parts by weight of the total monomers (1) and (2).

Before completing the polymerization of the syrup, it may be desirable to add a photoactive crosslinking agent, preferably in an amount providing 0.01 to 1 percent by weight of the total monomers (1) and (2). This tends to provide higher cohesive values with very little loss in adhesive values such as quick-stick. Preferred photoactive crosslinking agents are

|  | Maximum absorption wavelength in CH$_2$Cl$_2$ (nanometers) |
|---|---|
| 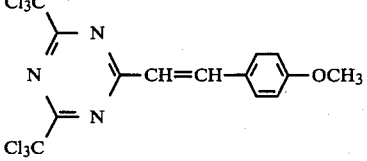 | 377 |
| 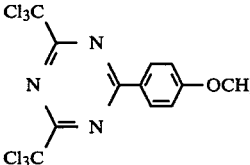 | 330 |
| 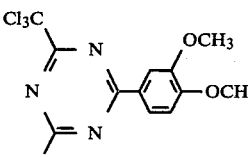 | 353 |

|  | Maximum absorption wavelength in CH₂Cl₂ (nanometers) |
|---|---|
| 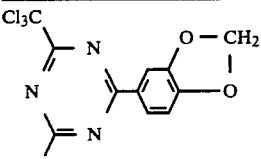 | 356 |

Other useful crosslinking agents include multi-functional alkyl acrylate monomers such as 1,6-hexanediol diacrylate, these preferably being used at about 0.1 percent and not more than one percent of the syrup. At much more than one percent of multi-functional alkyl acrylate monomer, there would be significant loss in tackiness and adhesion.

The extent of polymerization can be monitored by measuring the refractive index of the polymerizable mixture. For example, the refractive index may change from about 1.45 for a partially polymerized syrup to about 1.48 at about 100% reaction. The change in refractive index occurs linearly with conversion of the unsaturated moiety. See, for example, discussions about the method in *Polymerization at Advanced Degrees of Conversion,* G. P. Gladyshev and K. M. Gibov, Keter Press, Jerusalem, 1970.

In the current state of the art, photopolymerization of thin coatings is carried out in an inert atmosphere. Any inert atmosphere such as nitrogen, carbon dioxide, helium or argon is suitable and a little oxygen can be tolerated. A sufficiently inert atmosphere can be achieved by covering a layer of the photoactive mixture with a plastic film which is transparent to ultraviolet radiation and irradiating through that film in air.

Good results have been attained using a bank of 40-watt fluorescent black lamps. General Electric and Sylvania each market such a lamp designated "F40T12/BL". The GE lamp emits mainly between 310 nm and 430 nm with a maximum at 365 nm. The Sylvania lamp emits mainly between 310 and 400 nm with a maximum at 350 nm. Good results have also been obtained with mercury lamps, namely 400 watt and 1000 watt medium-pressure street lights (General Electric HID H400A-33-1). While the fluorescent lamps have been mounted within the chamber which provides an inert atmosphere, the mercury lamps are hotter and were mounted outside the chamber. A sheet of 0.4-cm heat-resistant glass placed 1.3 cm above the coating to be polymerized served to seal the chamber and to filter out radiation below 310 nm.

In using the fluorescent lamps, the operating intensity has usually been adjusted to 4–6 milliwatts/cm² at a distance of 12.5 cm from the coating. The mercury street lights provided an intensity of about 4–6 milliwatts/cm² at the coating. The intensity of the irradiation was measured with an International Light Inc. "UV Light Bug" in combination with a IL 745 UV curing radiometer. The "Light Bug" was equipped with a WB-320 filter with a quartz wide-eye diffuser which transmitted light between 240 and 430 nanometers, maximum sensitivity 365 mm. The radiometer was calibrated with an Hg-Xe source, assuming monochromatic irradiance at 350 mm.

Although other copolymerizable monomers tend to detract from the objectives of the invention as mentioned above, certain other materials can be blended into the photoactive mixtures such as pigments, tackifiers and reinforcing agents which do not copolymerize with the alkyl acrylate monomer. However, the addition of any such material adds complexity and hence expense to an otherwise simple, straightforward, economical process and is not preferred except to achieve specific results.

Pressure-sensitive adhesive tapes of the examples and the comparative tapes discussed below employed as the backing member biaxially-oriented polyethylene terephthalate film having a thickness of about 2 mils (50 micrometers). Each tape was slit to a width of ½ inch (1.27 cm) and had an adhesive thickness of about 2 mils (50 micrometers). The tapes were tested for Adhesion Value and Shear Value as follows:

Adhesion Value

Tape is adhered by its adhesive to a stainless steel plate under the weight of a 4.5-kg hard rubber roller. Peelback at 180° is measured by attaching the free end of the tape to a scale and moving the stainless steel plate away from the scale at a rate of about 30 centimeters per minute.

Shear Value

A strip of tape is adhered by its adhesive to a stainless steel plate under the weight of a 4.5-kg hard rubber roller with a free end of the tape extending beyond the plate and the adhesive contact area being one inch by ½ inch (2.54 cm by 1.27 cm). After 30 minutes, the plate is placed in a preheated oven and positioned 2° from the vertical to prevent peeling. After 10 minutes in the oven, a 500-gram mass is suspended from the free end, and the time at which the mass falls is noted. The test is discontinued if the tape has not failed after 10,000 minutes. All failures in the tests for Shear Value were cohesive.

In the following examples, all parts are given by weight.

EXAMPLE 1

A mixture of
70 parts of isooctyl acrylate
30 parts N-vinyl-2-pyrrolidone
0.04 part of 2,2-dimethoxy-2-phenyl acetophenone (obtained as "Irgacure" 651)

was partially photopolymerized in an inert (nitrogen) atmosphere using two F15T8/BL cylindrical fluorescent black light lamps manufactured by General Electric Company. They emit light principally in the near U.V. wavelength region over the range from 320 nanometers to 380 nanometers and emit no light at less than about 300 nanometers and a minimum amount above 800 nanometers. No filters were used. This partial photopolymerizing provided a coatable syrup of about 1500 cps (Brookfield). After adding 0.11 part of the "Irgacure" 651 to the syrup with thorough mixing, the mixture was coated using a conventional knife coater onto a paper backing member having a silicone release coating on both faces and immediately passed through an inert (nitrogen) chamber and irradiated with a bank of 40-watt fluorescent black light lamps, i.e., F40T12/BL, Sylvania, to provide an exposure of 1115 millijoules. The resultant uncrosslinked copolymer had a Fikentscher K-value of 117. The pressure-sensitive adhesive layer thus produced was transferred to a biaxially-oriented polyethylene terephthalate film of 2 mils (50 micrometers) thickness to provide a test tape. Tests on the tape indicated an Adhesion Value of 35 ounces per ½ inch of width, a Shear Value at 50° C. of more than 10,000 minutes and a Shear Value at 100° C. of 394 minutes.

EXAMPLES 2–9

A number of tapes were made and tested as in Example 1 except for differences in the amount of "Irgacure" 651 (if any) added to the partially polymerized syrup and in the U.V. exposure of the coating. Results are tabulated below.

| Example No. | Amount of Addit'l Irgacure | Exposure (millijoules) | K-Value | Shear Value in minutes at 50° C. | Shear Value in minutes at 100° C. | Adhesive Value (N/100 mm) |
|---|---|---|---|---|---|---|
| 2 | 0.192 | 275 | 108 | 5,129 | 180 | 77 |
| 3 | 0 | 625 | * | 10,000+ | 102 | 68 |
| 4 | 0.032 | 275 | * | 3,904 | 213 | 68 |
| 5 | 0.032 | 975 | * | 10,000+ | 181 | 74 |
| 6 | 0.192 | 975 | * | 10,000+ | 270 | 79 |
| 7 | 0.224 | 625 | * | 10,000+ | 126 | 79 |
| 8 | 0.112 | 135 | 108 | 10,000+ | 60 | 79 |
| 9 | 0.112 | 625 | * | 10,000+ | 205 | 79 |

*not measured but estimated to be about 108

The Shear Values at 50° C. and 100° C. of the tapes of Examples 1–9 are extraordinarily high for uncrosslinked pressure-sensitive adhesives.

EXAMPLES 10A AND 10B AND COMPARATIVE TAPES OF PIETSCH

Tapes were made as taught in Pietsch U.S. Pat. No. 3,728,148 Examples 3 and 7 (here called "P-3" and "P-7", respectively). A third tape was made as in Pietsch Example 9, except at a ratio of 70 parts 2-ethylhexyl acrylate and 30 parts N-vinyl-2-pyrrolidone, here called "P-9A". As in those examples, solutions of the copolymers were applied directly to biaxially-oriented polyethylene terephthalate film having a thickness of 1 mil (25 micrometers).

For comparisons, two tapes of the present invention (here called Examples 10A and 10B) were made by the two-step irradiation procedure of Example 1, supra, except using only 0.1 part of additional "Irgacure" 651 and the same monomers and monomer proportions as in Example P-9A, thus providing a direct comparison to a tape of the Pietsch patent. Each of the resultant transfer tapes was transfered from its paper backing to biaxially-oriented polyethylene terephthalate film having a thickness of 50 micrometers. Test results are reported in the following table:

| Example No. | Exposure (millij.) | K-Value | Shear Value in minutes at 50° C. | Shear Value in minutes at 100° C. | Adhesion Value (N/100 mm) |
|---|---|---|---|---|---|
| P-3 | | 62 | 2 | 1 | 48 |
| P-7 | | 69 | 3 | 1 | 50 |
| P-9A | | 76 | 21 | 1 | 50 |
| 10A | 625 | 117 | 7,834 | 156 | 83 |
| 10B | 1200 | 117 | 7,978 | 163 | 74 |

EXAMPLES 11–14

A tape of the present invention was made in the same way as the tape of Example 1 except that together with the additional "Irgacure" 651 was added a crosslinking agent, namely, a chromophore-substituted halomethyl-s-triazine of the formula

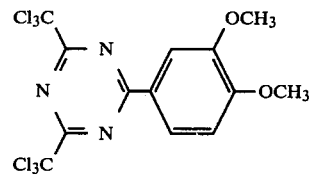

Tests on the resultant tapes indicated:

| Example No. | Exposure (millijoules) | Parts of Triazine | Shear Value in minutes at 50° C. | Shear Value in minutes at 100° C. | Adhesion Value (N/100 mm) | Gel Swell |
|---|---|---|---|---|---|---|
| 11 | 625 | 0.195 | 10,000+ | 10,000+ | 72 | 880% |
| 12 | 625 | 0.125 | 10,000+ | 10,000+ | 77 | 1105% |
| 13 | 1115 | 0.125 | 10,000+ | 10,000+ | 79 | 875% |
| 14 | 975 | 0.075 | 2,693 | 580 | 70 | N.T. |

Additional Comparative Tapes Based on Pietsch

For comparison to the crosslinked tapes of Examples 11–14, a number of tapes were made in the same way as P-3, P-7 and P-9A except that the crosslinking agent, benzoyl peroxide, was used as in Example 5 of the Pietsch patent. In making the additional tapes, the benzoyl peroxide was employed at two levels, 3% by weight as in Example 5 of Pietsch and 0.5% by weight, the minimum useful amount according to col. 3, line 5 of the Pietsch patent. Tests on these additional tapes are reported in the following table:

| Example No. | Weight % benzoyl peroxide | Shear Value in minutes at 50° C. | Shear Value in minutes at 100° C. | Adhesion Value (N/100 mm) | Gel Swell | K-Value |
|---|---|---|---|---|---|---|
| P-3C | 3 | 10,000+ | 10,000+ | 57 | 371% | — |
| P-7C | 3 | 10,000+ | 10,000+ | 53 | 368% | — |
| P-9AC | 3 | 10,000+ | 10,000+ | 50 | 304% | — |
| P-7C' | 0.5 | 48 | 1 | 61 | — | 62 |
| P-9AC' | 0.5 | 42 | 1 | 57 | — | 55 |

As indicated in the above table, tapes P-3C, P-7C and P-9AC became crosslinked so that gel swell in ethyl acetate could be measured but not the Fikentscher K-Value. Tapes P-7C' and P-9AC' were still soluble, thus indicating that they were substantially uncrosslinked so that their Fikentscher K-Values could be measured, but not the gel swell in ethyl acetate.

EXAMPLE 15-18

A mixture of
60 parts of isooctyl acrylate
40 parts N-vinyl-2-pyrrolidone
0.04 part of "Irgacure" 651
was partially polymerized as in Example 1 to provide a coatable syrup. After adding 0.10 part of the "Irgacure" 651 to the syrup, a transfer tape was made as in Example 1 except at an exposure of 625 millijoules. Its pressure-sensitive adhesive layer was transferred to biaxially oriented polyethylene terephthalate film as in Example 1 to provide the tape of Example 15.

A tape (Example 16) was made in the same way as in Example 15 except that together with the additional "Irgacure" 651 was added 0.15 part of the crosslinking agent used in Examples 11-14.

A mixture of
80 parts of isooctyl acrylate
20 parts N-vinyl-2-pyrrolidone
0.04 part of "Irgacure" 651
was partially polymerized and converted into an uncrosslinked tape (Example 17) and a crosslinked tape (Example 18) in the same manner as in Examples 15 and 16, respectively. Tests on the tapes of Examples 15-18 are reported below:

| Example No. | Parts of Triazine | Shear Value in minutes at 50° C. | Adhesion Value (N/100 mm) | K-Value | Gel Swell |
|---|---|---|---|---|---|
| 15 | — | 10,000+ | 74 | 108 | — |
| 16 | 0.15 | 10,000+ | 77 | — | 1298% |
| 17 | — | 2,258 | 72 | 122 | — |
| 18 | 0.15 | 10,000+ | 79 | — | 744% |

I claim:

1. A pressure-sensitive adhesive copolymer of essentially only
   (1) acrylic acid ester of non-tertiary alcohol, the alkyl groups of which have an average of about 4 to 14 carbon atoms, said acrylic acid ester being per se polymerizable to a sticky, stretchable, elastic adhesive mass, and
   (2) N-vinyl-2-pyrrolidone, wherein the improvement comprises the N-vinyl-2-pyrrolidone comprises from 15 to 50 parts by weight of the total monomers (1) and (2) and the copolymer when uncrosslinked has a Fikentscher K-value exceeding 100 and when crosslinked has a gel swell in ethyl acetate exceeding 600%.

2. Process for making a pressure-sensitive adhesive copolymer including the steps of
   (a) preparing a radiation-sensitized solventless, liquid mixture consisting essentially of by weight
      (1) a major proportion of acrylic acid ester of non-tertiary alcohol, the alkyl groups of which have an average of about 4 to 14 carbon atoms, said acrylic acid ester being per se polymerizable to a sticky, stretchable, elastic adhesive mass,
      (2) a minor proportion of at least one modifying monomer copolymerizable therewith, and
      (3) 0.01 to 5 parts of a photoinitiator per 100 parts of the total monomers (1) and (2), and
   (b) exposing the mixture in a mass to ultraviolet radiation until at least 95% of the monomer has been polymerized wherein the improvement comprises that the modifying copolymerizable monomer (2) is N-vinyl-2-pyrrolidone, is present in an amount exceeding 15 parts per 100 parts by weight of the total monomers (1) and (2), and in that the polymerizing step (b) is so controlled as to produce a copolymer which when uncrosslinked has a Fikentscher K-value exceeding 100 and when crosslinked has a gel swell in ethyl acetate exceeding 600%.

3. Process for making a pressure-sensitive adhesive copolymer as defined in claim 2 wherein said liquid mixture further comprises (4) 0.01 to 2 parts of a photoactive crosslinking agent, and in step (b) the copolymer is crosslinked to an insoluble state.

4. Pressure-sensitive adhesive tape comprising a backing member and a pressure-sensitive adhesive coating comprising a copolymer as defined in claim 1.

5. Method of making a pressure-sensitive adhesive tape comprising the steps of
   (a) exposing to ultraviolet radiation a mixture which is photopolymerizable to a pressure-sensitive adhesive state and comprises by weight
      (1) a major proportion of acrylic acid ester of non-tertiary alcohol, the alkyl groups of which have an average of about 4 to 14 carbon atoms, said acrylic acid ester being per se polymerizable to a sticky, stretchable elastic adhesive mass,
      (2) a minor proportion of N-vinyl-2-pyrrolidone exceeding 15 parts by weight of the total monomers (1) and (2), and
      (3) 0.01 to 5 parts of a photoinitiator per 100 parts by weight of the total monomers (1) and (2), to provide a partially-polymerized syrup having a viscosity of 300 to 20,000 centipoises at ordinary room temperature,
   (b) coating said syrup onto a backing member to provide a layer having a thickness of about 25-250 micrometers, and
   (c) in an inert atmosphere, irradiating the coating with ultraviolet radiation to further polymerize it to a pressure-sensitive adhesive state, the irradiating being so controlled as to produce a copolymer which when uncrosslinked has a Fikentscher K-value exceeding 100 and when crosslinked has a gel swell in ethyl acetate exceeding 600%.

6. Method as defined in claim 5 wherein prior to step (b) 0.01 to 2 parts of a photoactive crosslinking agent per 100 parts by weight of the total monomers (1) and (2) is blended with said syrup, and in the irradiating step (c) the thus-modified syrup is crosslinked to an insoluble state.

* * * * *